(12) United States Patent
Shiromaru et al.

(10) Patent No.: US 7,813,906 B2
(45) Date of Patent: *Oct. 12, 2010

(54) METHOD OF PREDICTING RESIDUAL SERVICE LIFE FOR ROLLING BEARINGS AND A DEVICE FOR PREDICTING RESIDUAL SERVICE LIFE FOR ROLLING BEARINGS

(75) Inventors: Isao Shiromaru, Hiroshima (JP); Makoto Tanaka, Hiroshima (JP); Yoshinobu Akamatsu, Kuwana (JP); Yoji Nagayasu, Tokyo (JP); Shingo Boda, Tokyo (JP); Takuzo Iwatsubo, c/o Kobe University, 1, 1-chome, Rokkodai-cho, Nada-ku, Kobe-shi, Hyogo 657-8501 (JP)

(73) Assignees: The Chugoku Electric Power Co., Inc., Hiroshima (JP); Takuzo Iwatsubo, Kobe-shi (JP)

( * ) Notice: Subject to any disclaimer, the term of this patent is extended or adjusted under 35 U.S.C. 154(b) by 868 days.

This patent is subject to a terminal disclaimer.

(21) Appl. No.: 10/515,182

(22) PCT Filed: May 28, 2003

(86) PCT No.: PCT/JP03/06652

§ 371 (c)(1),
(2), (4) Date: Jun. 7, 2005

(87) PCT Pub. No.: WO03/106960

PCT Pub. Date: Dec. 24, 2003

(65) Prior Publication Data

US 2005/0246150 A1 Nov. 3, 2005

(30) Foreign Application Priority Data

May 31, 2002 (JP) .............................. 2002-160752

(51) Int. Cl.
*G06G 7/48* (2006.01)
(52) U.S. Cl. .............................. 703/7; 703/6
(58) Field of Classification Search ..................... 703/1, 703/2, 6–8; 73/593
See application file for complete search history.

(56) References Cited

U.S. PATENT DOCUMENTS 3,705,516 A 12/1972 Reis ........................... 73/71.4

(Continued)

FOREIGN PATENT DOCUMENTS

JP 7-218334 8/1995

(Continued)

OTHER PUBLICATIONS

Troyer, "Effective Integration of Vibration Analysis and Oil Analysis", Proceedings of Condition Monitoring '99, 1999.*

(Continued)

*Primary Examiner* — Kamini S Shah
*Assistant Examiner* — Herng-Der Day
(74) *Attorney, Agent, or Firm* — Edwards Angell Palmer & Dodge LLP

(57) ABSTRACT

A method that utilizes signals from an accelerometer in resonant frequency bands or high frequency bands to, in a cost-effective manner, measure wear particle penetration of lubricant and lubricant degradation, both of which greatly affect prediction of residual service life; and, using as a basis these measurements of wear particle penetration and lubricant degradation, enables accurate estimation of residual service life for rolling bearings in the early stages.

34 Claims, 9 Drawing Sheets

U.S. PATENT DOCUMENTS

| | | | | |
|---|---|---|---|---|
| 5,058,434 | A * | 10/1991 | Zaschel | 73/659 |
| 6,763,312 | B1 * | 7/2004 | Judd | 702/56 |
| 7,006,953 | B2 * | 2/2006 | Takemura et al. | 703/2 |
| 7,305,330 | B2 * | 12/2007 | Urakami et al. | 703/6 |
| 7,559,240 | B2 * | 7/2009 | Iwatsubo et al. | 73/593 |

FOREIGN PATENT DOCUMENTS

| | | |
|---|---|---|
| JP | 7-311082 | 11/1995 |
| JP | 11-2239 | 1/1999 |
| JP | 2001-124665 | 5/2001 |
| JP | 2002-148148 | 5/2002 |

OTHER PUBLICATIONS

Peng et al., "An Integrated Approach to Fault Diagnosis of Machinery using Wear Debris and Vibration Analysis", Wear, vol. 255, Issue 7-12, 2003, pp. 1221-1232.*

Tech. Publication—Conf. Proceed. -53$^{rd}$ Meeting of the Soc. for Machinery Prevention Tech. "Failure Analysis: A—Foundation for Diagnostic and Prognostics Development"; Apr. 19-22, 1999; Byington et al. pp. 356-366 (l2pgs).

Tech. Publication—IEEE Transactons on Sonics and Ultrasonics; "The signature Analysis of Sonic Bearing Vibrations"; Nov. 1980; vol. 27, No. 6; Braun; pp. 317 to 328 (12 pgs.).

Technical Publication—Tribology International; "A review of vibration and acoustic measurement methods for the detection of defects in rolling element bearings"; Nov. 1999; vol. 32; Tandon et al. pp. 469 to 680 (12pgs).

Tech. Publication—Conf. Proceedings 1999 Maintenance and Reliability Conf. (MACRON'99); "dynamics Modeling for Mechanical Fault Diagnostics and Prognostics"; May 10-12, 1999; Begg et al.;(12pgs).

Canadian Office Action dated Dec. 6, 2006.

Supplementary European Search Report of Jun. 28, 2006.

* cited by examiner

METHOD OF PREDICTING RESIDUAL SERVICE LIFE FOR ROLLING BEARINGS AND A DEVICE FOR PREDICTING RESIDUAL SERVICE LIFE FOR ROLLING BEARINGS

BACKGROUND OF THE INVENTION

1. Field of the Invention

The present invention is related to a method of predicting residual service life for rolling bearings and a device for predicting residual service life for rolling bearings that estimates the remaining service life of rolling bearings residing on mechanical rotating devices such as pumps and fans.

2. Description of the Related Art

Rolling bearings in large numbers are found being used in the rotating components of a wide variety of machineries, and when these rolling bearings fail to work properly, various inconveniences can result, such as interruption in operation of the machinery. Generally, rolling bearings provide superb performance, and have, when used under proper conditions, long service lives, which last until repeated stress causes spalling. However, service life varies not only according to usage conditions and environment; it can even vary within identical machinery and bearings.

Mechanical problems causing stress, such as unsuitable lubricant, misalignment of the rotating shaft, or improper assembly of rolling bearings, can cause unexpected problems for rolling bearings. The majority of rolling bearing problems are caused by inadequate lubrication, the result of such factors as wear particle penetration and lubricant degradation. A variety of methods have been introduced for the purpose of predicting residual service life for these rolling bearings. Examples include methods that use accelerometers to measure vibration signals from bearings, and that sound warnings when vibration readings for the bearings exceed some activation barrier. Some methods use analysis of the frequencies of vibrations from bearings to predict the cause of defects. Some methods estimate service life by predicting the rate of increase in bearing vibration readings. Further, there are methods such as the Shock Pulse Method and the Acoustic Emission (AE) Method.

The most common prediction methods used are those that utilize predictions of the rate of increase in bearing vibration readings. These methods predict the rate of increase in vibration acceleration of bearings through the use of linear, quadratic and exponential curves, and calculate the time until the vibration readings reach a preset activation barrier.

The Shock Pulse Method is a method of prediction that utilizes shock pulses (intense compression waves) to discover rolling bearing defects in the early stages and to predict lubricant degradation levels. Generally, at the instant the rolling element (or roller) and the bearing ring of a rolling bearing come into direct contact, unique vibrations occur, and large amounts of stress focalize under the surface of the material, creating pressure waves in the material. If the contact surface has an irregular dispersion of asperities, large numbers of irregular pressure waves are created at the moment of contact. Each of these pressure waves is called an intense compression wave (or shock pulse), and dissipates as they propagate in the form of ultrasonic waves, from the point of contact throughout the rest of the bearing and the inside of the bearing housing. Here, through examination of shock pulse activity, predictions are made regarding the thickness of the lubricant film in the bearing and the degree to which the bearing has been damaged, enabling prediction of lubricant degradation levels and allowing the determination of appropriate intervals between lubricant supplementations.

The AE Method is a method of predicting residual service life that utilizes AE signals in a frequency higher than the acceleration to discover early-stage rolling bearing defects. The AE Method is a method of prediction that uses AE signals, which are created when built-up strain energy is released in the form of sound as solid objects undergo changes in shape or physical breakdown. These AE signals, which are transmissions of elastic waves, are released when elastic energy is released from inside a material, not necessarily only during physical breakdown, but also when dislocation or transformation of crystal structures in a material occurs. The AE signals are processed while the rolling bearing is in operation through the use of an AE sensor, and, by observing how often AE waves occur, predictions can be made regarding the rolling bearing.

Using these kinds of prediction methods, unanticipated rolling bearing failures can be predicted before they actually happen, and appropriate intervals for replacing affected bearings can be estimated in advance. Thus, the "normal operation life", during which detection of irregularities in bearings occurs, and the "defective life", during which bearing overheating and fracturing occur, can be clearly defined, and the interval between the normal operation life and defective life, in short the residual service life, can be predicted. For mechanical rotating devices, predictions regarding whether there are irregularities and regarding what the cause of the irregularities are can be carried out, and the extent of any irregularities can be predicted, enabling determination of appropriate maintenance intervals for rolling bearings.

The most common kinds of statistical prediction for vibration acceleration, utilize, as a parameter, readings of vibrations until fulfillment of the predicted service life, and carry out curvilinear regression using quadratic and exponential curves so as to define residual service life as the period until vibration readings reach some activation barrier. Further, with the Shock Pulse Method, the frequency of shock pulses can be used to predict lubricant degradation levels, enabling the determination of appropriate intervals for lubricant supplementation. Alternately, the AE Method predicts residual service life in the same way as statistical predictions that use vibration acceleration.

However, with the traditional prediction methods described above, setting the activation barrier for vibrations is difficult, and residual service life varies greatly depending on the activation barrier; thus, making accurate predictions of residual service life is extremely difficult. Further, by the time vibrations begin increasing, the rolling bearing is already in the stage of total fatigue failure, making the creation of long-term maintenance plans difficult; moreover, even when prediction of residual service life is carried out, repairs may not be implemented in time. As a result, in practice, rolling bearings are often replaced in the early stages, despite the fact that they may not yet be close to the end of their true service life. Further, because of the poor precision in predicting residual service life for these methods, at actual power plants, factories and similar facilities, it is impossible to extend the interval between inspection cycles, necessitating maintenance systems where every single bearing is replaced during set inspection times every few years. The inability of these methods to reduce costs and labor—which is the main purpose of maintenance—is thus a problem.

Again, although the said traditional Shock Pulse Method can detect lubricant degradation in the early stages and determine appropriate intervals for lubricant supplementation, it still has the limitation of not being able to make precise predictions regarding residual service life based on the current conditions.

Further, although the traditional AE Method can predict residual service life at an earlier stage than the said statistical methods using vibration acceleration, the AE (Acoustic Emission) sensor and the signal processing circuit that are used for predictions are cost-prohibitive; in addition, AE waves are very faint, making the method prone to noise interference.

The present invention was devised to solve the aforementioned problems. In short, the object of the present invention is to provide a method of predicting residual service life for rolling bearings and a device for predicting residual service life for rolling bearings that can, in a cost-effective manner, utilize signals in resonant frequency bands or signals in high frequency bands obtained via an accelerometer in order to detect wear particle penetration in the lubricant, as well as lubricant degradation, both of which greatly affect rolling bearing service life, and that can in the early stages, using the wear particle penetration and lubricant degradation as a basis, accurately estimate service life for rolling bearings.

SUMMARY OF THE INVENTION

The present invention provides a method of predicting residual service life for rolling bearings being comprised of the following: a means of obtaining fundamental data that uses a testing device to obtain data regarding the relationship, for rolling bearings (3), of wear particle penetration levels to vibration levels and service life, and to obtain data regarding the relationship, for rolling bearings (3), of lubricant degradation levels to vibration levels and service life; a means of measurement, where an accelerometer (4) is used to obtain vibration signals of diagnostic rolling bearings (3) residing on mechanical rotating devices (1, 2), such as pumps and fans, for the purpose of measuring signals in resonant frequency bands only detectable at extremely high levels of sensitivity or vibration acceleration signals in high frequency bands; and a means of prediction that uses readings obtained via said means of measurement and data obtained via said means of obtaining fundamental data to predict, for said diagnostic rolling bearings (3), wear particle penetration levels and lubricant degradation levels, and to calculate residual service life for said diagnostic rolling bearings (3).

The means of obtaining fundamental data involves affecting indentations upon the rolling contact surfaces of said rolling bearings (3) in order to simulate wear particle penetration, for the purpose of quantifying the relationship of wear particle penetration to bearing vibration and service life. An alternate method for simulating wear particle penetration involves introducing a foreign substance into the lubricant of said rolling bearings (3) and changing the volume, size, viscosity or elasticity of the substance, for the purpose of quantifying the relationship of wear particle penetration to bearing vibration and service life. In order to simulate lubricant degradation, the volume of lubricant in said rolling bearings (3) is reduced, for the purpose of quantifying the relationship of lubricant degradation to bearing vibration and service life. Alternate methods for simulating lubricant degradation include affecting oxidative degradation upon lubricant in rolling bearings (3), and introducing water into lubricant existent in said rolling bearings (3), for the purpose of quantifying the relationship of lubricant degradation to bearing vibration and service life.

For the means of obtaining fundamental data, vibration signals from an accelerometer (4) in resonant frequency bands only detectable at extremely high levels of sensitivity are used to quantify the relationship of wear particle penetration to vibration and service life. Alternately, for said means of obtaining fundamental data, vibration signals from an accelerometer (4) in high frequency bands are used to quantify the relationship of wear particle penetration to vibration and service life.

For the means of obtaining fundamental data, vibration signals from an accelerometer (4) in resonant frequency bands only detectable at extremely high levels of sensitivity are utilized to quantify the relationship of lubricant degradation to vibration and service life. Alternately, for the means of obtaining fundamental data, vibration signals from an accelerometer (4) in high frequency bands are utilized to quantify the relationship of lubricant degradation to vibration and service life.

The means of measurement utilizes vibration signals from an accelerometer (4) in resonant frequency bands only detectable at extremely high levels of sensitivity to measure wear particle penetration, the density of wear particle indentations, and further, the size of wear particle indentations. Alternately, the means of measurement utilizes vibration signals from an accelerometer (4) in high frequency bands to measure wear particle penetration, the density of wear particle indentations, and further, the size of wear particle indentations.

The means of measurement utilizes vibration signals from an accelerometer (4) in resonant frequency bands only detectable at extremely high levels of sensitivity to measure lubricant degradation. Alternately, the means of measurement utilizes vibration signals from an accelerometer (4) in high frequency bands to measure lubricant degradation.

The means of prediction utilizes vibration signals from an accelerometer (4) in resonant frequency bands only detectable at extremely high levels of sensitivity to estimate wear particle penetration, the density of wear particle indentations, and further, the size of wear particle indentations, as well as to do calculations regarding residual service life. Alternately, the means of prediction utilizes vibration signals from an accelerometer (4) in high frequency bands to estimate wear particle penetration, the density of wear particle indentations, and further, the size of wear particle indentations, as well as to do calculations regarding residual service life.

For the means of prediction, vibration signals from an accelerometer (4) in resonant frequency bands only detectable at extremely high levels of sensitivity and vibration signals from an accelerometer (4) in high frequency bands are used to make estimates regarding lubricant degradation levels and calculations regarding residual service life.

For the means of prediction, it is preferable to use pre-measured data regarding diagnostic rolling bearings (3) in a normal state of fatigue, related to bearing load, rolling speed, operating time and rolling bearing designation.

The means of prediction utilizes data obtained via said means of measurement and pre-measured vibration data of diagnostic rolling bearings (3) in a state of normal fatigue to, by calculating the rate of increase of vibration signals in low frequency bands of vibration acceleration, judge whether the diagnostic rolling bearings (3) are in the stage of first signs of fatigue or in the stage of total fatigue failure.

The means of prediction utilizes signals from an accelerometer (4) in resonant or high frequency bands of diagnostic rolling bearings (3) obtained via said means of measurement, and pre-measured vibration data of diagnostic rolling bearings (3) in a state of normal fatigue to judge whether the diagnostic rolling bearings (3) are undergoing a process of normal fatigue, a process of wear particle penetration, or a process of lubricant degradation.

If the diagnostic rolling bearings (3) have been judged to be in a state of normal fatigue, meaning there has been no wear particle penetration or lubricant degradation, the rating life is calculated, and the residual service life is defined as the rating life. Further, if it has been judged that the diagnostic rolling bearings (3) have undergone wear particle penetration and are in the stage of first signs of fatigue, vibration data obtained during the means of obtaining fundamental data is utilized to estimate the size of the penetrating wear particles and to calculate residual service life. Further, if it has been judged that the lubricant existent in the diagnostic rolling bearings (3) has undergone degradation and that said diagnostic rolling bearings (3) are in the stage of first signs of fatigue, vibration data obtained during the means of obtaining fundamental data is utilized to estimate the lubricant's degradation levels and to calculate residual service life.

Finally, if it has been judged that the stage of total fatigue failure has been reached, residual service life is calculated, using as a basis the said rate of increase in low frequency bands of vibration acceleration as well as the interval between initial wear particle penetration and total fatigue failure or the interval between initial lubricant degradation and total fatigue failure. During the means of obtaining fundamental data, for the method of predicting residual service life as comprised above, if lubricant has, due to wear particle penetration or lubricant degradation, already undergone degradation, resulting in the formation of indentations on rolling bearings, a testing device is utilized to obtain fundamental data regarding the relationship of vibration acceleration to wear particle penetration levels and of vibration acceleration to lubricant degradation levels. For the means of measurement, an accelerometer (4) is utilized to obtain vibration signals from diagnostic rolling bearings (3), used to make predictions of residual service life, that reside on mechanical rotating devices (1, 2), for the purpose of measuring signals in resonant frequency bands only detectable at extremely high levels of sensitivity or signals in high frequency bands. Further, the means of prediction utilizes readings obtained via the means of measurement and data obtained via said means of obtaining fundamental data, as well as pre-measured vibration data of diagnostic rolling bearings (3) in a state of normal fatigue, related to bearing load, rolling speed, operating time and rolling bearing designation to estimate, for the diagnostic rolling bearings (3), wear particle penetration levels and lubricant degradation levels, and to calculate, for the diagnostic rolling bearings (3), residual service life.

Initially, the means of prediction utilizes the rate of increase in vibration to judge whether said diagnostic rolling bearings (3) are in the stage of first signs of fatigue or in the stage of total fatigue failure.

If judged to be in the stage of first signs of fatigue, prediction is further carried out as follows: first, data obtained via said means of measurement from an accelerometer (4), related to vibration signals from diagnostic rolling bearings (3) in resonant frequency bands or high frequency bands, as well as pre-measured vibration data from diagnostic rolling bearings (3) in a state of normal fatigue, is utilized to judge whether the diagnostic rolling bearings (3) are undergoing a process of normal fatigue, are undergoing a process of wear particle penetration, or whether lubricant is undergoing a process of degradation.

If diagnostic rolling bearings (3) are judged to be in the stage of first signs of fatigue, but are still in a state of normal fatigue, meaning there is no wear particle penetration and no lubricant degradation, the rating life is calculated, and the residual service life is defined as the rating life. Subsequently, if it is judged that diagnostic rolling bearings (3) have undergone wear particle penetration and are in the stage of first signs of fatigue, vibration data obtained during said means of obtaining fundamental data is utilized to estimate the size of penetrating wear particles and to calculate the residual service life. Further, if it has been judged that the diagnostic rolling bearings (3) have undergone lubricant degradation and that the diagnostic rolling bearings (3) are in the stage of first signs of fatigue, vibration data obtained during the means of obtaining fundamental data is utilized to estimate said lubricant's degradation levels and to calculate residual service life.

Finally, if it has been judged that the stage of total fatigue failure has been reached, the residual service life is calculated, using as a basis the said rate of increase in low frequency bands of vibration acceleration. Here, the method of prediction for the present invention not only predicts the rate of increase in vibration, but it also utilizes measurements of the interval between initial wear particle penetration and a rapid increase in acceleration or the interval between initial lubricant degradation and a rapid increase in acceleration to calculate residual service life more precisely.

The present invention, accordingly, regularizes replacement cycles, enabling more efficient maintenance of mechanical rotating devices (1, 2), because the residual service life of rolling bearings (3) residing on a mechanical rotating device (1, 2) can be predicted while the device is in operation. For instance, a schedule can be easily implemented to replace rolling bearings (3) residing on mechanical rotating devices (1, 2) in power plants in autumn, instead of summer, where operating rates are higher, enabling more efficient maintenance. Further, because of the lack of precision with traditional methods of predicting residual service life, for machinery with rotating elements that require regular inspection, the present invention makes it possible to predict residual service life earlier, meaning the interval between regular inspections can be extended, and data related to the degradation of rolling bearings can be made more readily available; thus, a more efficient system of maintenance can be anticipated when moving from a traditional system of regularly scheduled inspections to a maintenance system based on the specific condition of each machine.

The device for predicting residual service life for rolling bearings (3) for the present invention includes, the following: an accelerometer (4) that measures vibration signals from diagnostic rolling bearings (3) to predict residual service life; an analogue/digital converter (5) that converts data obtained via said accelerometer (4); a quantitative feature extraction device (6) that extracts vibration signals converted by said analogue/digital converter (5) from vibration signals in resonant frequency bands only detectable at extremely high levels of sensitivity or signals in high frequency bands; a database of resulting measurements (7) that has saved in it fundamental data, including the relationship, for rolling bearings (3), of wear particle penetration levels to vibration and bearing service life, the relationship of lubricant degradation to vibration and bearing service life, has saved in it vibration data of diagnostic rolling bearings (3) residing on mechanical rotating devices (1, 2), such as pumps and fans, obtained when the diagnostic rolling bearings (3) are in a state of normal fatigue, and has saved in it data related to bearing load, rolling speed, operating time and rolling bearing designation; a device for predicting residual service life (8) that, utilizing data stored in said database of resulting measurements (7), predicts wear particle penetration levels and lubricant degradation levels in said diagnostic rolling bearings (3), and calculates the residual service life, using as a basis vibration signals from the diagnostic rolling bearings (3) extracted via said quantitative feature extraction device (6); and a display device for predictions (9) that displays the resulting predictions of said device for predicting residual service life (8).

The device for predicting residual service life as comprised above uses signals from an accelerometer (4) in resonant frequencies or high frequencies to detect, in a cost-effective manner, lubricant penetration by wear particles and lubricant degradation, and in the early stages accurately estimates rolling bearing (3) service life, using as a basis the measured wear particle penetration levels and lubricant degradation levels.

It is preferable to further include an output device for inspection schedules and diagnostic reports (10) that outputs schedules for ensuing inspection times and diagnostic results reports for said diagnostic rolling bearings (3), using as a basis diagnostic results from said device for predicting residual service life (8). The output device for inspection schedules and diagnostic reports (10) can be a printer (12) or monitor.

The present invention, accordingly, regularizes replacement cycles and extends replacement intervals through use of the output device for inspection schedules and diagnostic reports (10), enabling more efficient maintenance of mechanical rotating devices (1, 2), because the residual service life of rolling bearings (3) residing on a mechanical rotating device (1, 2) can be predicted while the device is in operation. For instance, a schedule can be easily implemented to replace rolling bearings (3) residing on mechanical rotating devices (1, 2) in power plants in autumn, instead of summer, where operating rates are higher. Further, for machinery where traditionally regular inspection could not be avoided, the present invention makes it possible to predict residual service life earlier, meaning the interval between regular inspections can be extended, and data related to the degradation of rolling bearings can be made more readily available; thus, a more efficient system of maintenance can be anticipated when moving from a traditional system of regularly scheduled inspections to a maintenance system based on the specific condition of each machine.

A data transmission modem (11) that connects said waveform data and diagnostic results to the Internet network is further included. Using said data transmission modem (11) enables acquisition of simply vibration data alone from a remote location, and prediction of residual service life for rolling bearings (3) located in a fixed location can be accomplished from remote locations, further simplifying management of diagnostic results.

DESCRIPTION OF THE PREFERRED EMBODIMENTS

The preferred embodiments of the present invention will be described in detail with reference to the accompanying drawings.

Figure 1:
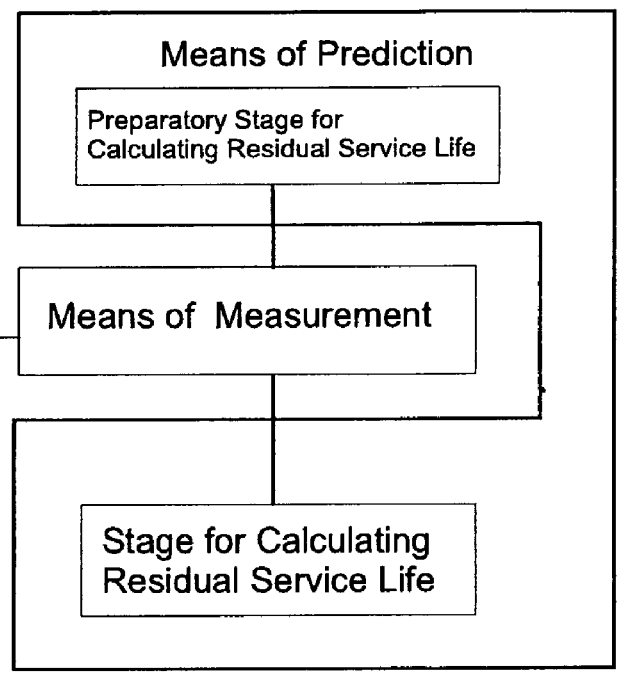
FIG. 1 is a block diagram illustrating the method of predicting residual service life for rolling bearings for the present invention.
Figure 2:
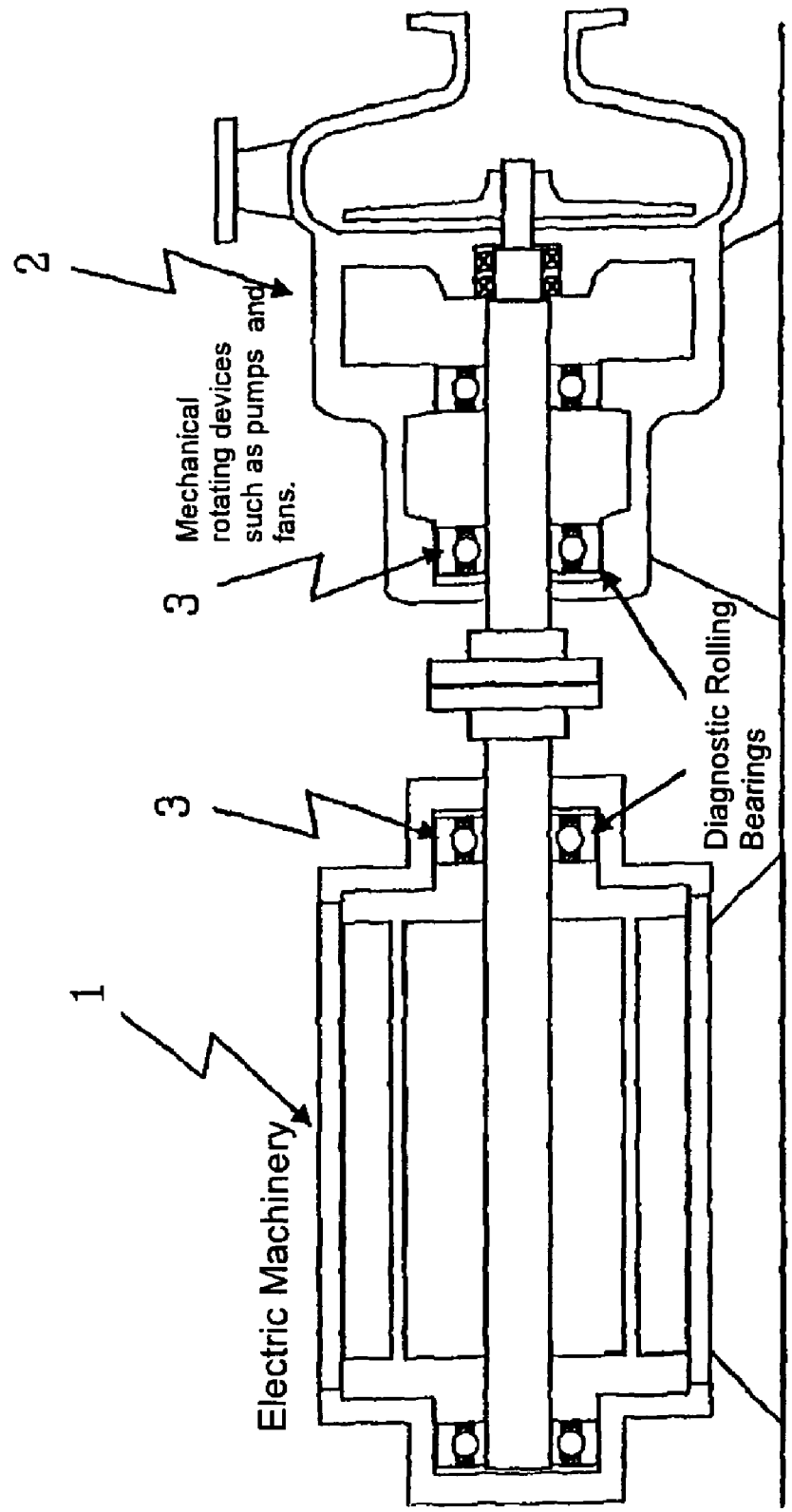
FIG. 2 is a cross-sectional example of the rolling bearings that reside on electric machinery or mechanical rotating devices, and that are the object of the predictions for the method of predicting residual service life.
Figure 3:
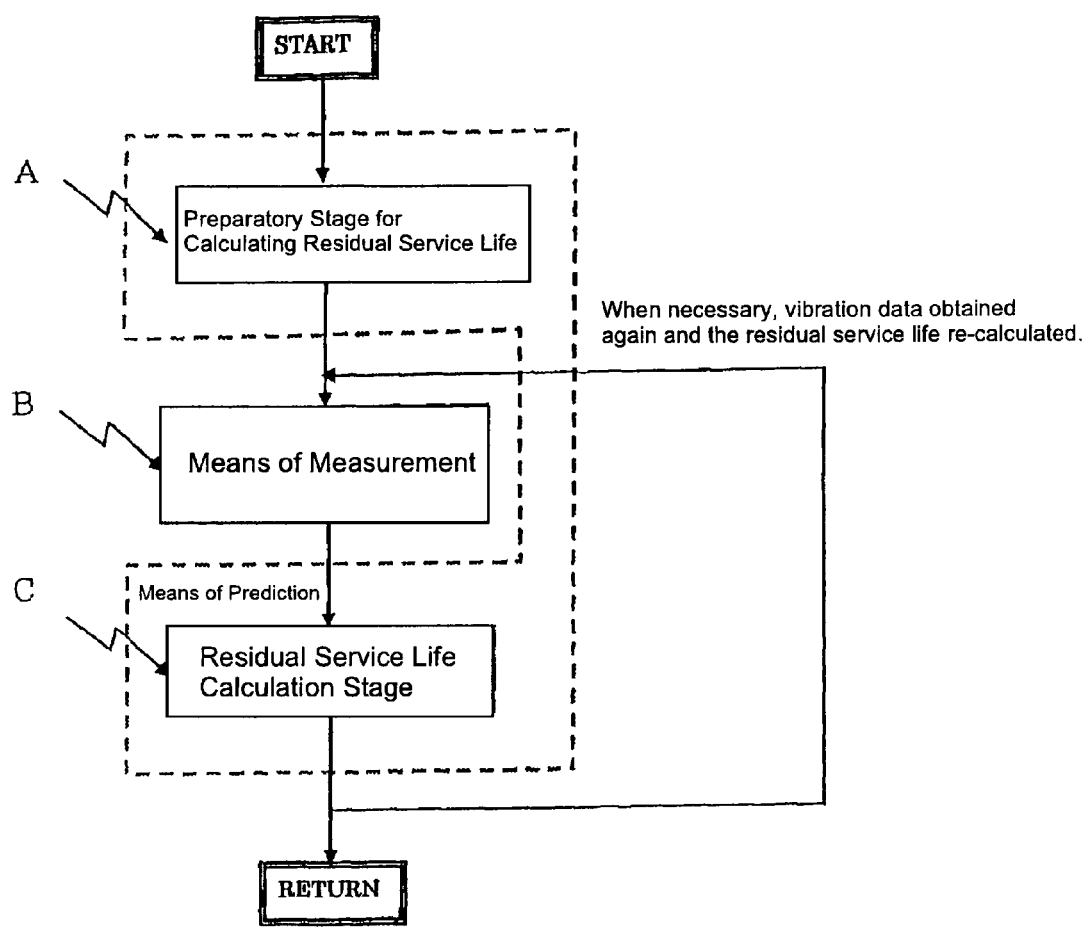
FIG. 3 is a flow chart illustrating the method of predicting residual service life for rolling bearings.
Figure 4:
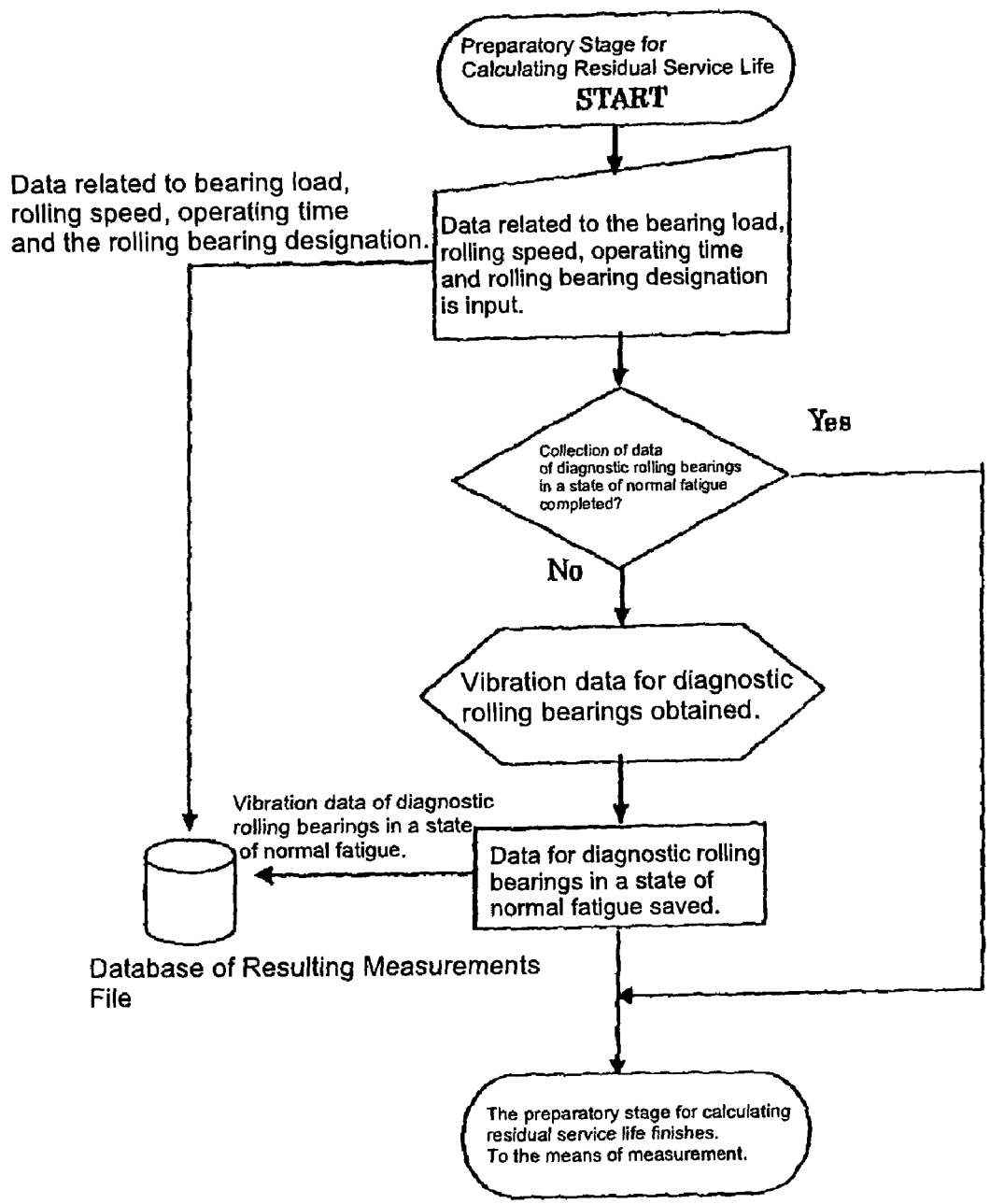
FIG. 4 is a flow chart illustrating Step A (the preparatory stage for calculating residual service life used for the means of prediction) of the flow chart shown in FIG. 3.
Figure 5:
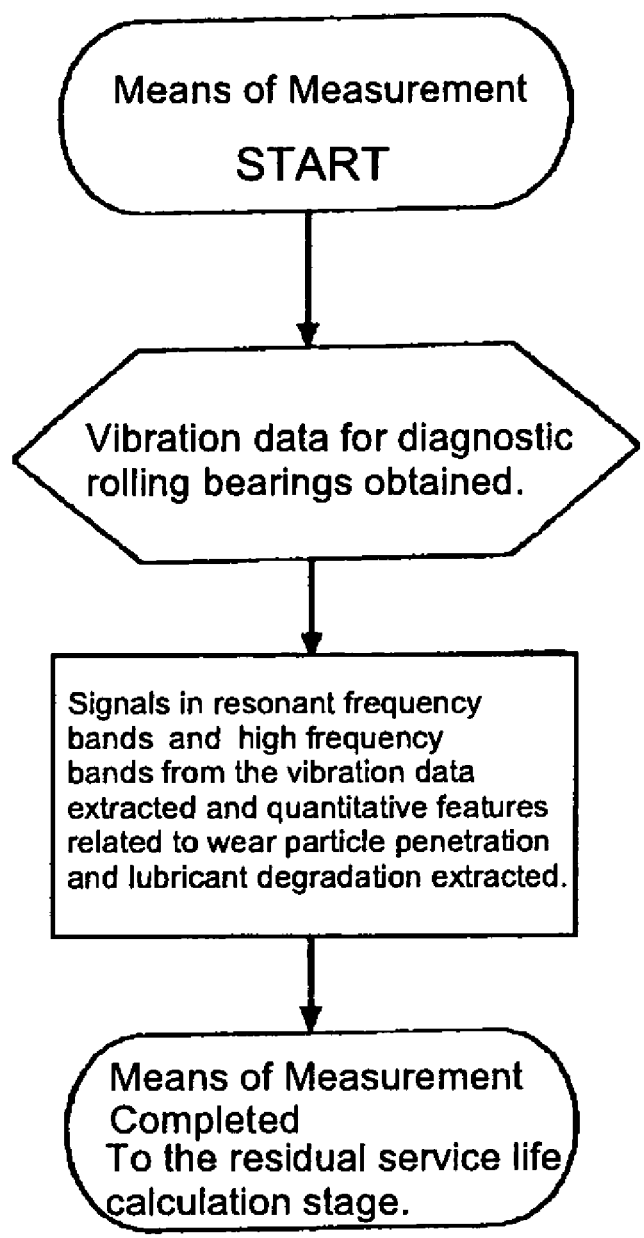
FIG. 5 is a flow chart illustrating Step B (the means of measurement) of the flow chart shown in FIG. 3.
Figure 6:
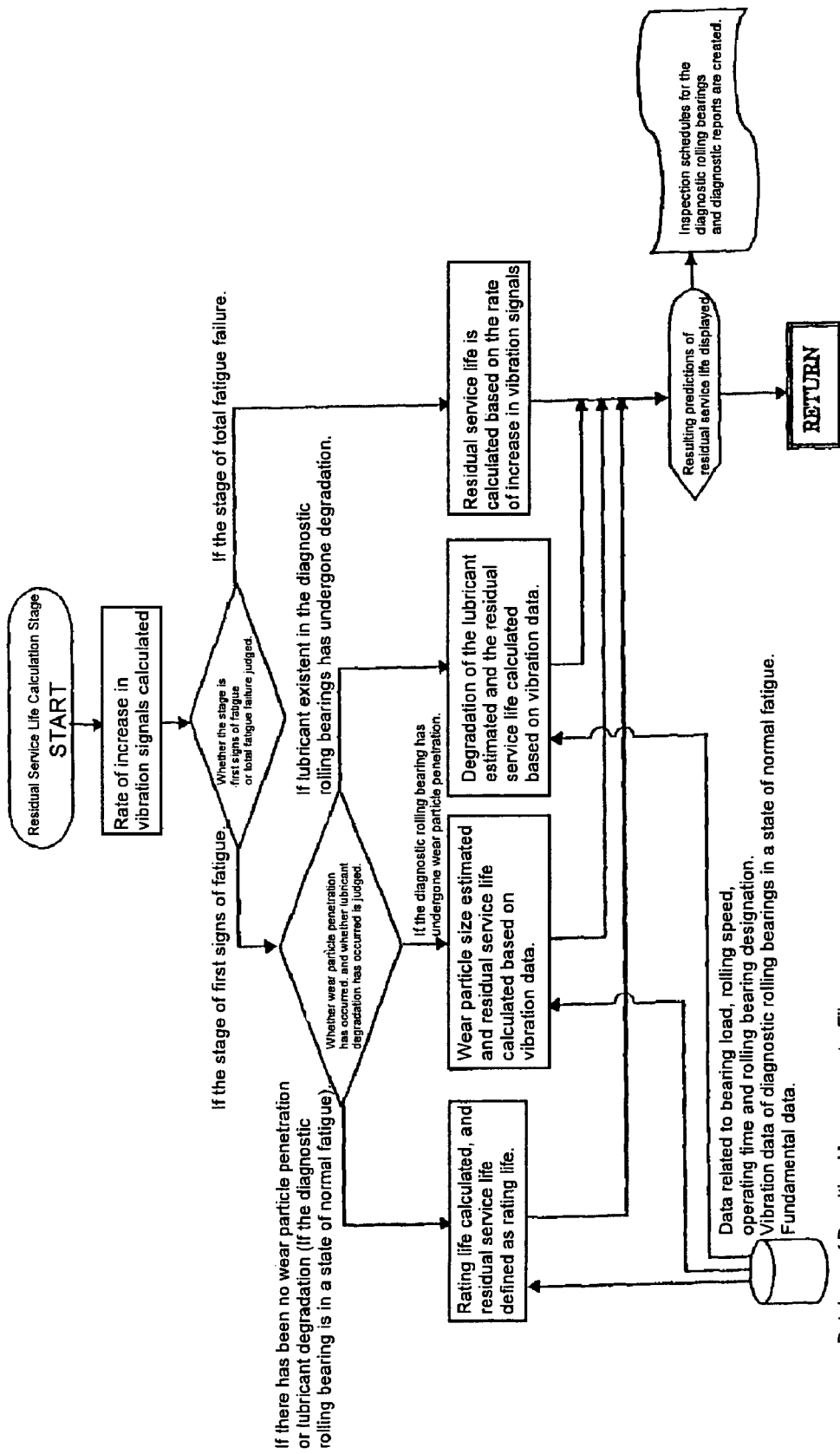
FIG. 6 is a flow chart illustrating Step C (the residual service life calculation stage used for the means of prediction) of the flow chart as shown in FIG. 3.

FIG. 1 is a block diagram illustrating the method of predicting residual service life for rolling bearings for the present invention. FIG. 2 is a cross-sectional example of the rolling bearings that reside on electric machinery or mechanical rotating devices, and that are the object of the predictions for the method of predicting residual service life. FIG. 3 is a flow chart illustrating the method of predicting residual service life for rolling bearings. FIG. 4 is a flow chart illustrating Step A (the preparatory stage for calculating residual service life used for the means of prediction) of the flow chart shown in FIG. 3. FIG. 5 is a flow chart illustrating Step B (the means of measurement) of the flow chart shown in FIG. 3. FIG. 6 is a flow chart illustrating Step C (the residual service life calculation stage used for the means of prediction) of the flow chart as shown in FIG. 3.

The method of predicting residual service life for rolling bearings for the present invention is comprised of the following: a means of obtaining fundamental data that uses a testing device to obtain in advance data related to the relationship of wear particle penetration to vibration and service life, and the relationship of lubricant degradation to vibration and service life; a means of measurement that measures signals in resonant frequency bands or high frequency bands from diagnostic rolling bearings (3) in order to predict residual service life, where the diagnostic rolling bearings (3) reside on mechanical rotating devices (1), such as pumps and fans, and the rotational units of moving electric machinery (2), as well as other such devices; and a means of prediction that predicts residual service life for diagnostic rolling bearings (3).

During the means of obtaining fundamental data, for the purpose of obtaining fundamental data, scratches are made directly on the rolling contact surfaces of disassembled bearings to simulate wear particle penetration, resulting in the appearance of indentations on the bearings; further, in order to simulate lubricant degradation, lubricant volumes are reduced in bearings that are then used in tests with a load testing device. An alternative method for simulating wear particle penetration is to introduce a foreign substance into the lubricant in place of wear particles; possible variations include volume or size of the foreign substance, as well as viscosity or elasticity of the foreign substance. Similarly, methods for simulating lubricant degradation include using lubricant that has undergone oxidative reduction and introducing water into the lubricant.

For the means of obtaining fundamental data, if lubricant has, due to wear particle penetration or lubricant degradation, already undergone degradation, resulting in the formation of indentations on rolling bearings (3), data is obtained regarding the relationship between vibration acceleration and indentation size. There are two main types of degradation rolling bearings (3) can undergo: fatigue flaking originating in sublayers occurs when the repeated stress that occurs on the surface of a rolling element becomes focalized in the sublayers of a rolling element, and results in flakes, which originate from below the surface, on the rolling contact surface and the raceway surface; fatigue flaking originating on the surface occurs when penetration of the lubricant by foreign substances such as wear particles leads to spalling on the rolling contact surface, and results in flakes, which originate on the surface, on the rolling contact surface. The actual bearing life is the life of a bearing until fatigue flaking originating in the sublayers occurs; in recent years, advances in material technology has extended the service life of bearings from several times longer to dozens of times longer than their original rating lives. However, the bearing life for fatigue flaking originating on the surface resulting from penetration of the lubricant by foreign substances is notably shorter: from several times to dozens of times shorter than the service life as calculated according to the appearance of fatigue flaking originating in the sublayers.

When predicting residual service life of rolling bearings (3), it is vital, as rolling bearings (3) undergo these various types of degradation, to consider these types of degradation and failure mechanisms. Accordingly, the present invention considers these types of degradation in rolling bearings (3), and, in order to predict residual service life earlier and more precisely than was traditionally possible, utilizes, as a foundation, said means of obtaining fundamental data.

For the means of prediction, the preparatory stage for calculating residual service life and the means of measurement are carried out upon diagnostic rolling bearings (3) residing on mechanical rotating devices (1, 2), where the diagnostic rolling bearings (3) are used to make predictions of residual service life. For the preparatory stage for calculating residual service life, data is obtained related to bearing load, rolling speed, operating time and the rolling bearing designation for diagnostic rolling bearings (3), and an accelerometer (4) is used to measure vibration data for diagnostic rolling bearings (3) in a state of normal fatigue. For the means of measurement, in the case of diagnostic rolling bearings (3) that are in operation, an accelerometer (4) is used to obtain vibration signals, and signals in resonant frequency bands only detectable at extremely high levels of sensitivity or signals in high frequency bands are measured.

Data obtained via the means of obtaining fundamental data and the preparatory step for calculating residual service life is utilized to predict whether diagnostic rolling bearings (3) are in the stage of first signs of fatigue or in the stage of total fatigue failure. For the residual service life calculation stage, the rate of increase in vibration signals is calculated in order to judge whether the diagnostic rolling bearings (3) are in the stage of first signs of fatigue or in the stage of total fatigue failure.

If the results of this residual service life calculation stage indicate that diagnostic rolling bearings (3) are in the stage of first signs of fatigue, predictions are carried out as follows.

First, vibration signals of diagnostic rolling bearings (3) in resonant frequency bands or high frequency bands obtained during the means of measurement via an accelerometer, as well as data obtained during the preparatory stage for calculating residual service life that is related to vibration signals of diagnostic rolling bearings (3) in a state of normal fatigue, are utilized to judge whether the diagnostic rolling bearing (3) is undergoing a process of normal fatigue, whether the rolling bearing (3) is undergoing a process of penetration by wear particles, or whether the lubricant is undergoing a process of degradation;

If diagnostic rolling bearings (3) have been judged to be in a state of normal fatigue, meaning no wear particle penetration and no lubricant degradation has occurred, the rating life is calculated, and the residual service life is defined as the rating life. The rating life is numerically expressed as the following formula (1):

Rating Life $L_{10} = 10^6/60n(C/P)^p$ where:
$L_{10}$: Basic Rating Life (h)
n: Bearing Speed (rpm)
C: Basic Load Rating (N or kgf)
P: Constant Bearing Load (N or kgf)
P: for ball bearings, p=3, and for rolling bearings, p=10/3

Alternately, if diagnostic rolling bearings (3) have been judged to have undergone wear particle penetration and are in the stage of first signs of fatigue, vibration data obtained during the means of obtaining fundamental data is utilized to estimate the size of particles that have penetrated the diagnostic rolling bearings (3) and to calculate residual service life.

Further, if diagnostic rolling bearings (3) have been judged to have undergone lubricant degradation and are in the stage of first signs of fatigue, vibration data obtained during the means of obtaining fundamental data is utilized to estimate lubricant degradation levels and to calculate residual service life.

Finally, if it has been judged that the stage of total fatigue failure has been reached, residual service life is calculated using as a basis the said rate of increase in vibration signals at low frequencies of vibration acceleration and the interval between initial wear particle penetration and total fatigue failure, or the interval between initial lubricant degradation and total fatigue failure. Specifically, the method of prediction for the present invention includes the utilization of measurements of the interval between initial wear particle penetration and a rapid increase in vibration acceleration to calculate residual service life more precisely.

The present invention, accordingly, regularizes replacement cycles, enabling more efficient maintenance of mechanical rotating devices (1, 2), because the residual service life of rolling bearings (3) residing on a mechanical rotating device (1, 2) can be predicted while the device is in operation. For instance, a schedule can be easily implemented to replace rolling bearings (3) residing on mechanical rotating devices (1, 2) in power plants in autumn, instead of summer, where operating rates are higher.

Figure 7:
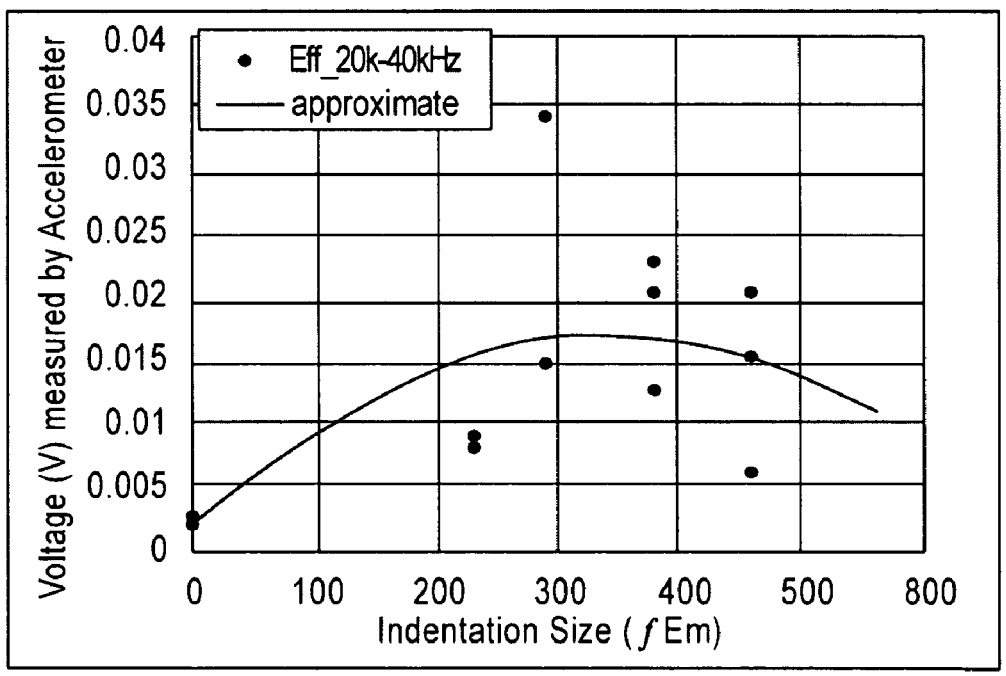
FIG. 7 is a graph that illustrates the detection of indentations through the utilization of vibration acceleration signals in high frequency bands.

FIG. 7 is a graph illustrating the relationship of the size of indentations for the purpose of simulating the presence of wear particles to vibration signals from an accelerometer in resonant frequency bands only detectable at extremely high levels of sensitivity.

The present invention utilizes vibration signals from an accelerometer (4) in resonant frequency bands only detectable at extremely high levels of sensitivity to detect outbreaks of wear particle indentations during the means of obtaining fundamental data, the means of measurement, and the means of prediction. In addition, vibration signals from an accelerometer (4) in high frequency bands can be utilized to obtain the size of indentations. As shown in the illustration, if indentations arise, vibration acceleration signals in high frequency bands in the range of 20 kHz to 40 kHz increase dramatically, as compared to the state of normal fatigue, where indentation size is 0 μm; this shows that detection of an outbreak of indentations can be easily accomplished.

Figure 8:
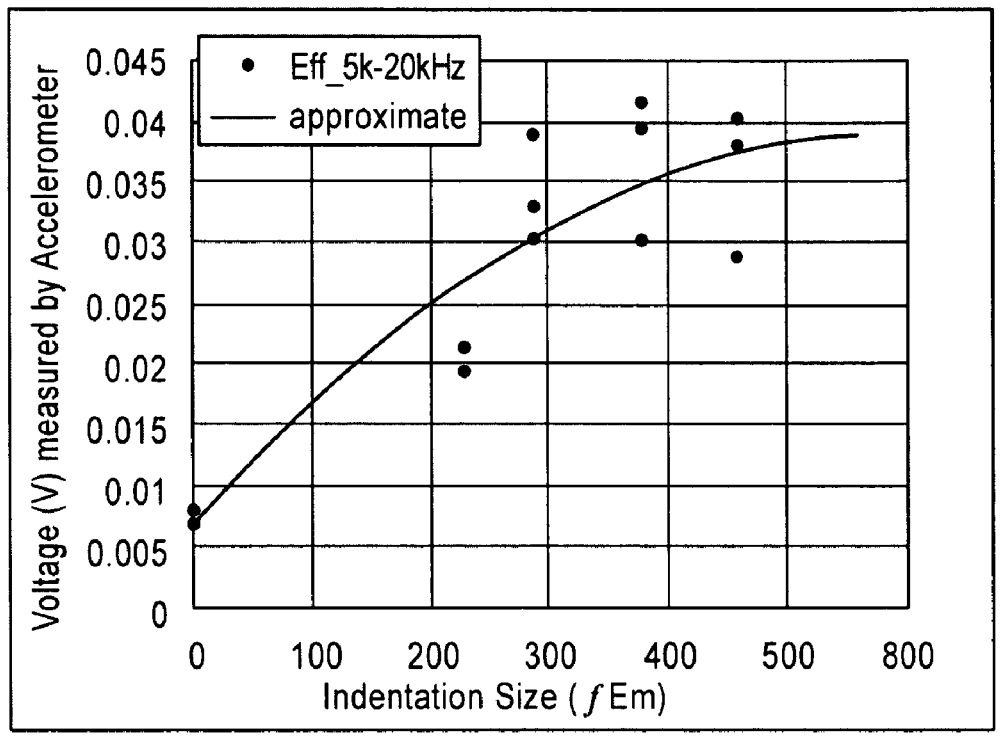
FIG. 8 is a graph that illustrates estimation of indentation size through the utilization of vibration acceleration signals in high frequency bands.

FIG. 8 is a graph illustrating the relationship of the size of indentations created for the purpose of simulating wear particle penetration to vibration signals from an accelerometer in high frequency bands.

As shown in the illustration, vibration acceleration signals in high frequency bands in the range of 5 kHz to 20 kHz increase proportionally as the size of indentations increases from 0 mm; this shows that measuring the size of indentations can be easily accomplished.

Figure 9:
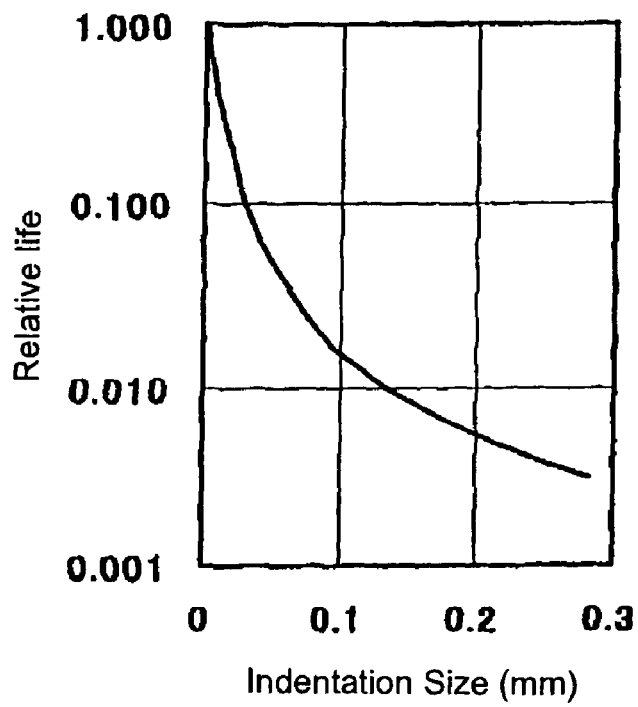
FIG. 9 is a graph that illustrates the relationship between the indentation size and residual service life.

FIG. 9 is a graph illustrating the effects of the outbreak of indentations on residual service life of rolling bearings.

If the rating life of a rolling bearing in a state of normal fatigue is defined as 1 relative life (1 relative life=rating life) the service life of rolling bearings affected with indentations is much shorter than the relative life, sometimes as much as 1/100th less than the relative life. Further, the cause of flaking on diagnostic rolling bearings (3) is without exception formation of indentations; it is widely acknowledged that the range of service life in this kind of situation is extremely limited. The means of prediction for the present invention utilizes these relationships between the size of indentations and residual service life to generate predictions.

Figure 10:
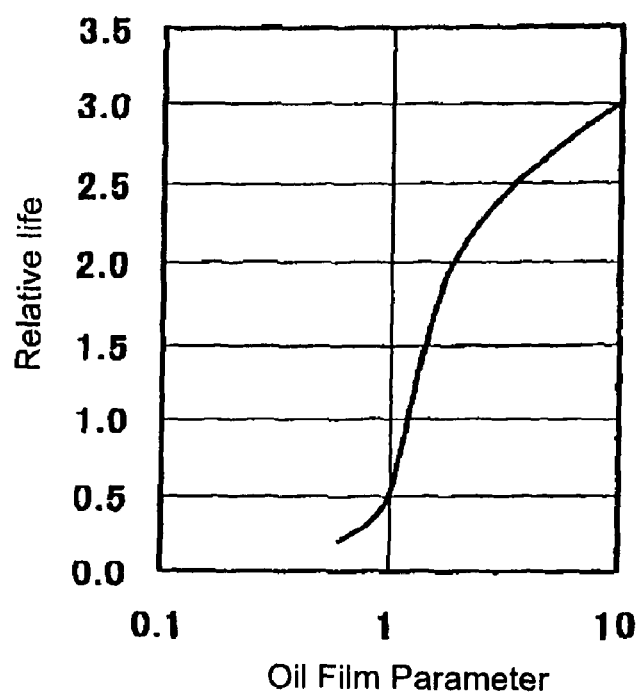
FIG. 10 is a graph illustrating the relationship between lubricant film pressure and residual service life.

FIG. 10 is a graph illustrating the relationship between lubricant film pressure and residual service life.

For residual service life of diagnostic rolling bearings (3), when the oil film parameter falls below 3, the relative life abruptly drops to below 2.5, and on occasion as low as 0.2. This kind of drastic decrease in residual service life is caused by direct metal-to-metal contact, a result of breaching in the oil film between the raceway surface and the rolling contact surface. The means of prediction for the present invention, in the same way that wear particle penetration levels are utilized to predict residual service life for rolling bearings (3), utilizes vibration signals from an accelerometer (4) in resonant frequency bands only detectable at extremely high levels of sensitivity or signals in high frequency bands in order to estimate lubricant degradation levels (the oil film parameter), and, for cases where lubricant is undergoing degradation, in order to calculate residual service life.

Figure 11:
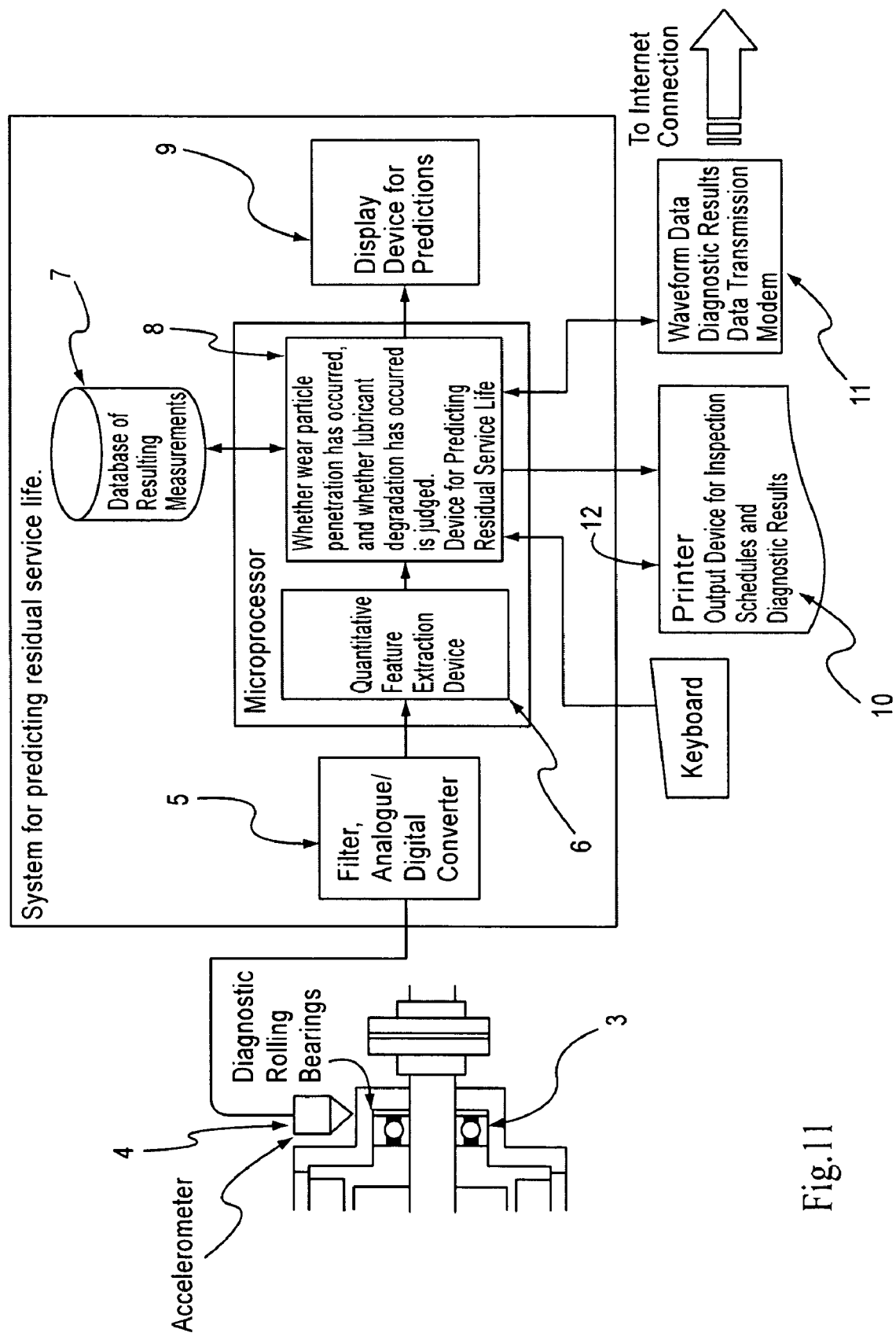
FIG. 11 is a block diagram illustrating the composition of the device for predicting residual service life for rolling bearings for the present invention.

FIG. 11 is a block diagram illustrating the composition of the device for predicting residual service life.

The device for predicting residual service life for rolling bearings is comprised of an accelerometer (4), an analogue/digital converter (5), a quantitative feature extraction device (6), a database of resulting measurements (7), a device for predicting residual service life (8), a display device for predictions (9), an output device for inspection schedules and diagnostic reports (10), and a data transmission modem (11). The analogue/digital converter (5) converts data obtained via the accelerometer (4) related to, but not limited to, the said diagnostic rolling bearings (3) used to make predictions of residual service life. The quantitative feature extraction device (6) extracts vibration signals in resonant frequency bands only detectable at extremely high levels of sensitivity from the vibration signals converted by the analogue/digital converter (5).

The database of resulting measurements (7) obtains and saves in it, in the manner previously mentioned, the following: fundamental data obtained in advance via a testing device related to the relationship of wear particle penetration to vibration and service life, and of lubricant degradation to vibration and service life; data related to bearing load, rolling speed, operating time and the rolling bearing designation of diagnostic rolling bearings (3), used to make predictions of residual service life, that reside on mechanical rotating devices (1), such as pumps and fans, and the rotational units of moving electric machinery (2), as well as other such devices; and vibration data of diagnostic rolling bearings (3) when in a state of normal fatigue.

The device for predicting residual service life (8) utilizes data stored in the database of resulting measurements (7) to predict wear particle penetration and lubricant degradation levels for diagnostic rolling bearings (3), for the purpose of predicting residual service life, using as a basis vibration signals of diagnostic rolling bearings (3) extracted via the quantitative feature extraction device (6).

The display device for predictions (9) displays results from the device for predicting residual service life (8). The output device for inspection schedules and diagnostic reports (10) outputs to devices such as printers (12) schedules for ensuing inspection times and diagnostic results reports for diagnostic rolling bearings (3), based on the results of predictions carried out by the device for predicting residual service life (8). In this way, the present invention, utilizes predictions of residual service life for rolling bearings (3) while mechanical rotating devices (1, 2) are in operation in order to enable the regularization of replacement cycles and replacement intervals, using the output device for inspection schedules and diagnostic reports (10), and resulting in more efficient maintenance of machinery. For instance, a schedule can be easily implemented to replace rolling bearings (3) residing on mechanical rotating devices (1, 2) in power plants in autumn, instead of summer, where operating rates are higher.

The device for predicting residual service life as comprised above uses signals from an accelerometer (4) in resonant frequencies or high frequencies to detect, in a cost effective manner, lubricant penetration by wear particles and lubricant degradation, and accurately estimates rolling bearing service life, using as a basis the measured wear particle penetration levels and lubricant degradation levels.

The data transmission modem (11) links the waveform data and diagnostic results to the Internet network. By accessing the Internet network in this way, prediction of residual service life for rolling bearings (3) in a fixed location from a remote location becomes feasible.

Further, the present invention is not limited to the embodiments as described above. If the present invention is applied to a method that judges whether diagnostic rolling bearings (3) are in the stage of first signs of fatigue or in the stage of total fatigue failure, and that calculates residual service life for diagnostic rolling bearings (3), the present invention is not limited to the composition as detailed above; it will be understood that various changes may be made without departing from the scope of the invention.

Again, if any composition that predicts residual service life is such that data related to the relationship of wear particle penetration or lubricant degradation to factors such as acceleration and indentation size is obtained in advance, and data that has been obtained related to the relationship of wear particle penetration and lubricant degradation to acceleration and service life is compared to and judged against vibration signals of diagnostic rolling bearings (3) extracted by the quantitative feature extraction device (6), for the purpose of estimating wear particle penetration and lubricant degradation and predicting residual service life for diagnostic rolling bearings (3), the present invention is not limited to the composition as detailed in the drawings; it will be understood that various changes may be made without departing from the scope of the invention.

APPLICABILITY IN INDUSTRIAL APPLICATION

The method for predicting residual service life for the present invention utilizes signals from an accelerometer in resonant frequency bands or high frequency bands to, in a cost-effective manner, measure wear particle penetration of lubricant and lubricant degradation, both of which greatly affect prediction of residual service life for rolling bearings; and, using as a basis these measurements of wear particle penetration and lubricant degradation, the method of predicting service life for the present invention enables accurate estimation of residual service life for diagnostic rolling bearings. The present invention, accordingly, regularizes replacement cycles and replacement intervals for rolling bearings, enabling more efficient maintenance of machinery. For instance, a schedule can be easily implemented to replace rolling bearings residing on mechanical rotating devices in power plants in autumn, instead of summer, where operating rates are higher. Further, for machinery that has traditionally required regular inspection, the present invention makes it possible to predict residual service life earlier, meaning the interval between regular inspections can be extended, and data related to the degradation of rolling bearings can be made more readily available; thus, a more efficient system of maintenance can be anticipated when moving from a traditional system of regularly scheduled inspections to a maintenance system based on the specific condition of each machine.

The device for predicting residual service life for the present invention enables easy and accurate estimation of service life for rolling bearings, with excellent precision, while being compact in form; further, by accessing the Internet network, and prediction of residual service life for rolling bearings located in a fixed location from remote locations becomes feasible.

What is claimed is:

1. A method of predicting residual service life for rolling bearings comprising the steps of:
   obtaining fundamental data that uses a testing device to obtain data regarding the relationship, for rolling bearings (3) of wear particle penetration levels to vibration levels and service life when no lubricant degradation occurs, and to obtain data regarding the relationship, for rolling bearings (3) of lubricant degradation levels to vibration levels and service life when no wear particle penetration occurs;
   measuring, using an accelerometer (4), to obtain vibration signals of diagnostic rolling bearings (3) residing on mechanical rotating devices (1, 2), for the purpose of measuring signals in resonant frequency bands only detectable at extremely high levels of sensitivity;
   calculating, using readings obtained via said measuring step and data obtained via said obtaining fundamental data step, rate of increase in said vibration signals to judge whether said diagnostic rolling bearings (3) are in a stage of first signs of fatigue or in a stage of total fatigue failure;
   determining, if it has been judged that said diagnostic rolling bearings (3) are in the stage of first signs of fatigue, whether said diagnostic rolling bearings (3) are undergoing a process of normal fatigue, a process of wear particle penetration without lubricant degradation, or a process of lubricant degradation without wear particle penetration using readings obtained via said measuring step and data obtained via said obtaining fundamental data step, wherein normal fatigue means there has been no wear particle penetration and no lubricant degradation; and
   estimating, for said diagnostic rolling bearings (3), either wear particle penetration levels if it has been determined that said diagnostic rolling bearings (3) are undergoing the process of wear particle penetration without lubrication degradation or lubricant degradation levels if it has been determined that said diagnostic rolling bearings (3) are undergoing the process of lubricant degradation without wear particle penetration, and predicting, residual service life for said diagnostic rolling bearings (3).

2. The method of predicting residual service life for rolling bearings according to claim 1 where said measuring step utilizes vibration signals from the accelerometer (4) in resonant frequency bands only detectable at extremely high levels of sensitivity to measure wear particle penetration.

3. The method of predicting residual service life for rolling bearings according to claim 1 where said measuring step utilizes vibration signals from the accelerometer (4) in resonant frequency bands only detectable at extremely high levels of sensitivity to measure the density of wear particle indentations.

4. The method of predicting residual service life for rolling bearings according to claim 1 where said measuring step utilizes vibration signals from the accelerometer (4) in resonant frequency bands only detectable at extremely high levels of sensitivity to measure the size of wear particle indentations.

5. The method of predicting residual service life for rolling bearings according to claim 1, where said measuring step utilizes vibration signals from the accelerometer (4) in resonant frequency bands only detectable at extremely high levels of sensitivity to measure lubricant degradation.

6. The method of predicting residual service life for rolling bearings according to claim 1, further comprising detecting the presence of wear particle indentations.

7. The method of predicting residual service life for rolling bearings according to claim 1, further comprising estimating the size of wear particle indentations.

8. A method of predicting residual service life for rolling bearings comprising the steps of:
   obtaining fundamental data that uses a testing device to obtain data regarding the relationship, for rolling bearings (3), of wear particle penetration levels to vibration levels and service life when no lubricant degradation occurs, and to obtain data regarding the relationship, for rolling bearings (3), of lubricant degradation levels to vibration levels and service life when no wear particle penetration occurs;
   measuring, for diagnostic rolling bearings (3) residing on mechanical rotating devices (1, 2) vibration acceleration signals in high frequency bands;
   calculating, using readings obtained via said measuring step and data obtained via said obtaining fundamental data step, rate of increase in measured vibration signals to judge whether said diagnostic rolling bearings (3) are in a stage of first signs of fatigue or in a stage of total fatigue failure;
   determining, if it has been judged that said diagnostic rolling bearings (3) are in the stage of first signs of fatigue, whether said diagnostic rolling bearings (3) are undergoing a process of normal fatigue, a process of wear particle penetration without lubricant degradation, or a process of lubricant degradation without wear particle penetration using readings obtained via said measuring step and data obtained via said obtaining fundamental data step, wherein normal fatigue means there has been no wear particle penetration and no lubricant degradation; and estimating, for said diagnostic rolling bearings (3), either wear particle penetration levels if it has been determined that said on diagnostic rolling bearings (3) are undergoing the process of wear particle penetration without lubrication degradation or lubricant degradation levels if it has been determined that said diagnostic rolling bearings (3) are undergoing the process of lubricant degradation without wear particle penetration, and predicting, residual service life for said diagnostic rolling bearings (3).

9. The method of predicting residual service life for rolling bearings according to claim 8, where said measuring step utilizes vibration signals from an accelerometer (4) in high frequency bands to measure wear particle penetration.

10. The method of predicting residual service life for rolling bearings according to claim 8, where said measuring step utilizes vibration signals from an accelerometer (4) in high frequency bands to measure the density of wear particle indentations.

11. The method of predicting residual service life for rolling bearings according to claim 8, where said measuring step utilizes vibration signals from an accelerometer (4) in high frequency bands to measure the size of wear particle indentations.

12. The method of predicting residual service life for rolling bearings according to claim 8, where said measuring step utilizes vibration signals from an accelerometer (4) in high frequency bands to measure lubricant degradation.

13. The method of predicting residual service life for rolling bearings according to claim 8 further comprising detecting a presence of wear particle indentations.

14. The method of predicting residual service life for rolling bearings according to claim 8 further comprising estimating, size of wear particle indentations.

15. The method of predicting residual service life for rolling bearings according to claim 1 or 8, where said step of obtaining fundamental data involves affecting the rolling contact surfaces of said rolling bearings (3) with indentations in order to simulate wear particle penetration, for the purpose of quantifying the relationship of wear particle penetration to bearing vibration and service life.

16. The method of predicting residual service life for rolling bearings according to claim 1 or 8, where said step of obtaining fundamental data involves introducing a foreign substance into the lubricant of said rolling bearings (3) and varying the volume or size of the substance in order to simulate wear particle penetration, for the purpose of quantifying the relationship of wear particle penetration to bearing vibration and service life.

17. The method of predicting residual service life for rolling bearings according to claim 1 or 8, where said step of obtaining fundamental data involves introducing a foreign substance into the lubricant of said rolling bearings (3), and varying the viscosity or elasticity of the foreign substance in order to simulate wear particle penetration, for the purpose of quantifying the relationship of wear particle penetration to bearing vibration and service life.

18. The method of predicting residual service life for rolling bearings according to claim 1 or 8, where said step of obtaining fundamental data involves reducing the volume of lubricant in said rolling bearings (3) in order to simulate lubricant degradation, for the purpose of quantifying the relationship of lubricant degradation to bearing vibration and service life.

19. The method of predicting residual service life for rolling bearings according to claim 1 or 8, where said step of obtaining fundamental data involves affecting oxidative degradation upon lubricant in said rolling bearings (3) in order to simulate lubricant degradation, for the purpose of quantifying the relationship of lubricant degradation to bearing vibration and service life.

20. The method of predicting residual service life for rolling bearings according to claim 1 or 8, where said step of obtaining fundamental data involves introducing water into the lubricant in said rolling bearings (3) in order to simulate lubricant degradation, for the purpose of quantifying the relationship of lubricant degradation to bearing vibration and service life.

21. The method of predicting residual service life for rolling bearings according to claim 1 or 8, where, for said step of obtaining fundamental data, vibration signals from an accelerometer (4) in resonant frequency bands only detectable at extremely high levels of sensitivity are used to quantify the relationship of wear particle penetration to vibration and service life.

22. The method of predicting residual service life for rolling bearings according to claim 1 or 8, where, for said step of obtaining fundamental data, vibration signals from an accelerometer (4) in high frequency bands are used to quantify the relationship of wear particle penetration to vibration and service life.

23. The method of predicting residual service life for rolling bearings according to claim 1 or 8 where, for said step of obtaining fundamental data, vibration signals from an accelerometer (4) in resonant frequency bands only detectable at extremely high levels of sensitivity are used to quantify the relationship of lubricant degradation to vibration and service life.

24. The method of predicting residual service life for rolling bearings according to claim 1 or 8 where, for said step of obtaining fundamental data, vibration signals from an accelerometer (4) in high frequency bands are used to quantify the relationship of lubricant degradation to vibration and service life.

25. The method of predicting residual service life for rolling bearings according to claim 1 or 8, further comprising obtaining premeasured data related to bearing load, rolling speed, operating time and rolling bearing designation of said diagnostic rolling bearings (3).

26. The method of predicting residual service life for rolling bearings according to claim 1 or 8, further comprising calculating a rating life if it has been determined that said diagnostic rolling bearings (3) are undergoing the process of normal fatigue and defining the rating life as the residual service life of said diagnostic rolling bearings (3).

27. The method of predicting residual service life for rolling bearings according to claim 1 or 8, further calculating if it has been judged that the stage of total fatigue failure has been reached, the residual service life, using as a basis the rate of increase in said vibration signals at low frequencies of vibration acceleration.

28. The method of predicting residual service life for rolling bearings according to claim 1 or 8, further comprising calculating if it has been judged that the stage of total fatigue failure has been reached, the residual service life, using as a basis, a interval between initial wear particle penetration and the stage of total fatigue failure, or a interval between initial lubricant degradation and the stage of total fatigue failure.

29. An apparatus for predicting residual service life for rolling bearings comprising:
- an accelerometer (4) that measures vibration signals from diagnostic rolling bearings (3) to predict residual service life;
- an analogue/digital converter (5) that converts the measured vibration signals obtained via said accelerometer (4);
- a quantitative feature extraction device (6) that extracts vibration signals in resonant frequency bands only detectable at extremely high levels of sensitivity from vibration signals converted by said analogue/digital converter (5);
- a database of resulting measurements (7) that has saved in it fundamental data records related to the relationship, for rolling bearings (3), of wear particle penetration to vibration and bearing service life when no lubricant degradation occurs, and the relationship of lubricant degradation to vibration and bearing service life when no particle penetration occurs, has saved in it vibration data of diagnostic rolling bearings (3) residing on mechanical rotating devices (1, 2) obtained when said diagnostic rolling bearings (3) are in a state of normal fatigue, and has saved in it data related to bearing load, rolling speed, operating time and rolling bearing designation;
- a device for predicting residual service life (8) that, utilizing data stored in said database of resulting measurements (7), judges whether said diagnostic rolling bearings (3) are in a stage of first signs of fatigue or in a stage of total fatigue failure, determines whether said diagnostic rolling bearings (3) are undergoing a process of normal fatigue, a process of wear particle penetration, without lubricant degradation, or a process of lubricant degradation without wear particle penetration, if it has been judged that said diagnostic rolling bearings (3) are in the stage of first signs of fatigue, wherein normal fatigue means there has been no wear particle penetration and no lubricant degradation, estimate either wear particle penetration levels if it has been determined that said diagnostic rolling bearings (3) are undergoing the process of wear particle penetration without lubricant degradation or lubricant degradation levels if it has been determined that said diagnostic rolling bearings (3) are undergoing the process of lubricant degradation without particle penetration, and predicts residual service life using as a basis the vibration signals from said diagnostic rolling bearings (3) extracted via said quantitative feature extraction device (6); and
- a display device for predictions (9) that displays results of said device for predicting residual service life (8).

30. An apparatus for predicting residual service life for rolling bearings comprising:
- an accelerometer (4) that measures vibration signals from diagnostic rolling bearings (3) to predict residual service life;
- an analogue/digital converter (5) that converts the measured vibration signals obtained via said accelerometer (4);
- a quantitative feature extraction device (6) that extracts vibration signals in high frequency bands from the vibration signals converted by said analogue/digital converter (5);
- a database of resulting measurements (7) that has saved in it fundamental data records related to the relationship, for rolling bearings (3), of wear particle penetration to vibration and bearing service life when no lubricant degradation occurs, and the relationship of lubricant degradation to vibration and bearing service life when no particle penetration occurs, has saved in it vibration data of diagnostic rolling bearings (3) residing on mechanical rotating devices (1, 2) obtained when said diagnostic rolling bearings (3) are in a state of normal fatigue, and has saved in it data related to bearing load, rolling speed, operating time and rolling bearing designation;
- a device for predicting residual service life (8) that, utilizing data stored in said database of resulting measurements (7), judges whether said diagnostic rolling bearings (3) are in a stage of first signs of fatigue or in a stage of total fatigue failure, determines whether said diagnostic rolling bearings (3) are undergoing a process of normal fatigue, a process of wear particle penetration, without lubricant degradation, or a process of lubricant degradation without wear particle penetration if it has been judged that said diagnostic rolling bearings (3) are in the stage of first signs of fatigue, wherein normal fatigue means there has been no wear particle penetration and no lubricant degradation, estimates either wear particle penetration levels if it has been determined that said diagnostic rolling bearings (3) are undergoing the process of wear particle penetration without lubricant degradation or lubricant degradation levels if it has been determined that said diagnostic rolling bearing (3) are undergoing the process of lubricant degradation without particle penetration, and predicts residual service life using as a basis the vibration signals from said diagnostic rolling bearings (3) extracted via said quantitative feature extraction device (6); and
- a display device for predictions (9) that displays results of said device for predicting residual service life (8).

31. The apparatus for predicting residual service life for rolling bearings according to claim 29 or 30 that further includes the following:
- an output device for inspection schedules and diagnostic reports (10) that outputs schedules for ensuing inspection times and diagnostic results reports for said diagnostic rolling bearings (3), using as a basis diagnostic results from said device for predicting residual service life (8).

32. The apparatus for predicting residual service life for rolling bearings according to claim 31, where said output device for inspection schedules and diagnostic reports (10) is a printer (12).

33. The apparatus for predicting residual service life for rolling bearings according to claim 31, where said output device for inspection schedules and diagnostic reports (10) is a monitor.

34. The apparatus for predicting residual service life for rolling bearings according to claim 29 or 30 that further includes the following: a data transmission modem (11) that connects waveform data and diagnostic results output from said device for predicting residual life (8) to the Internet network.

* * * * *